Oct. 29, 1968
R. D. GIBBS
3,407,474
APPARATUS FOR OBTAINING DESIRED POSITIONS OF ELECTRICAL
COILS RELATIVE TO MAGNETIC CORES
Filed July 28, 1966
2 Sheets-Sheet 1
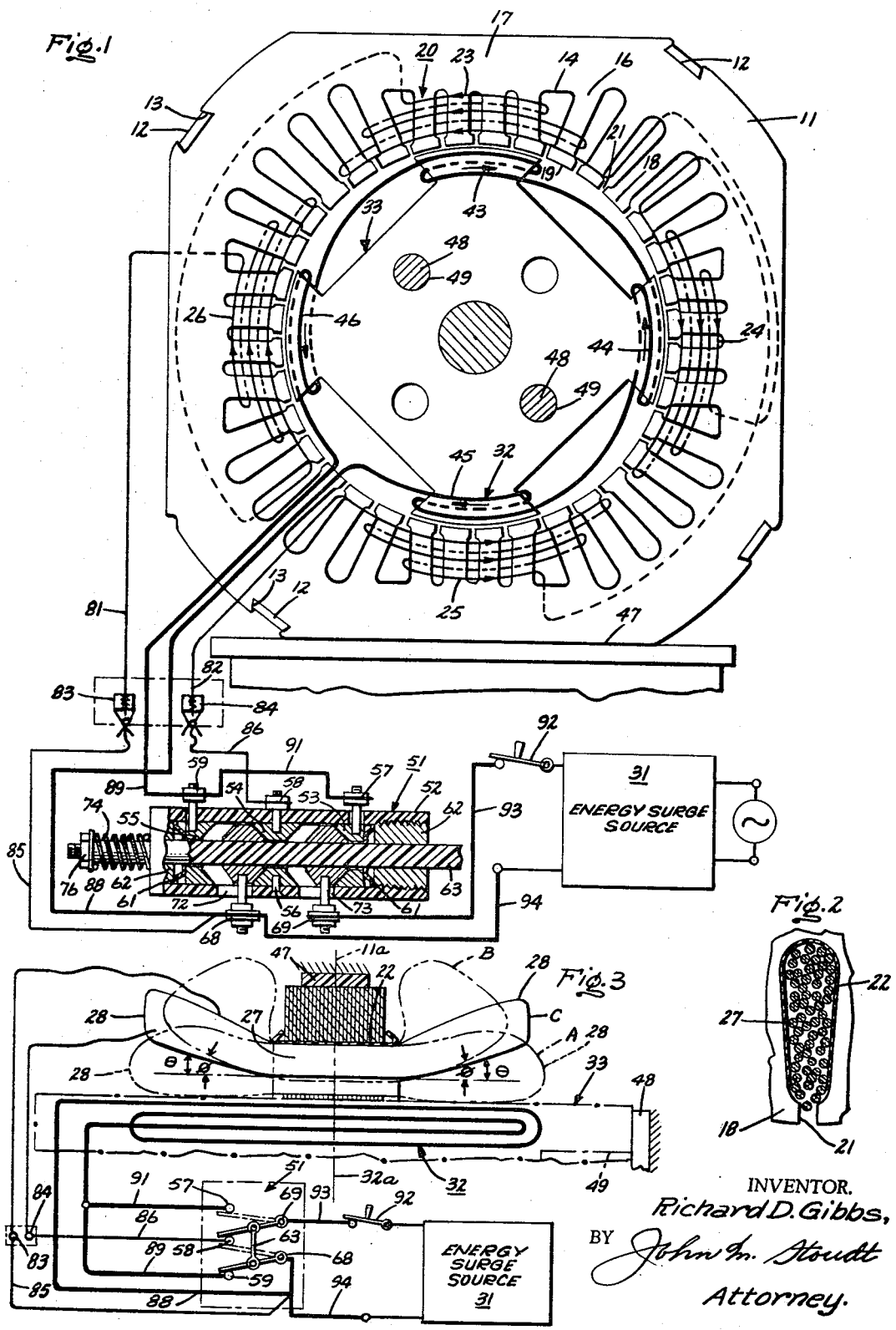
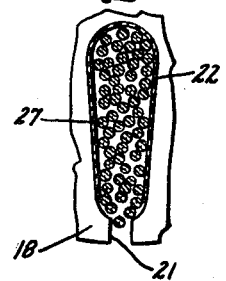
INVENTOR.
Richard D. Gibbs,
BY John M. Stoudt
Attorney.

Oct. 29, 1968  R. D. GIBBS  3,407,474
APPARATUS FOR OBTAINING DESIRED POSITIONS OF ELECTRICAL
COILS RELATIVE TO MAGNETIC CORES
Filed July 28, 1966  2 Sheets-Sheet 2
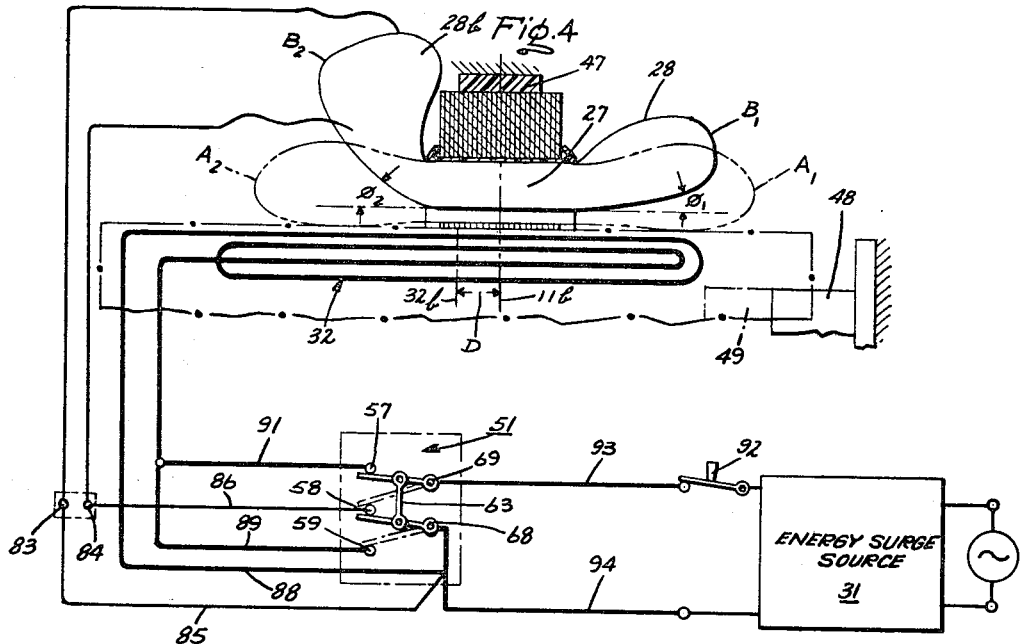
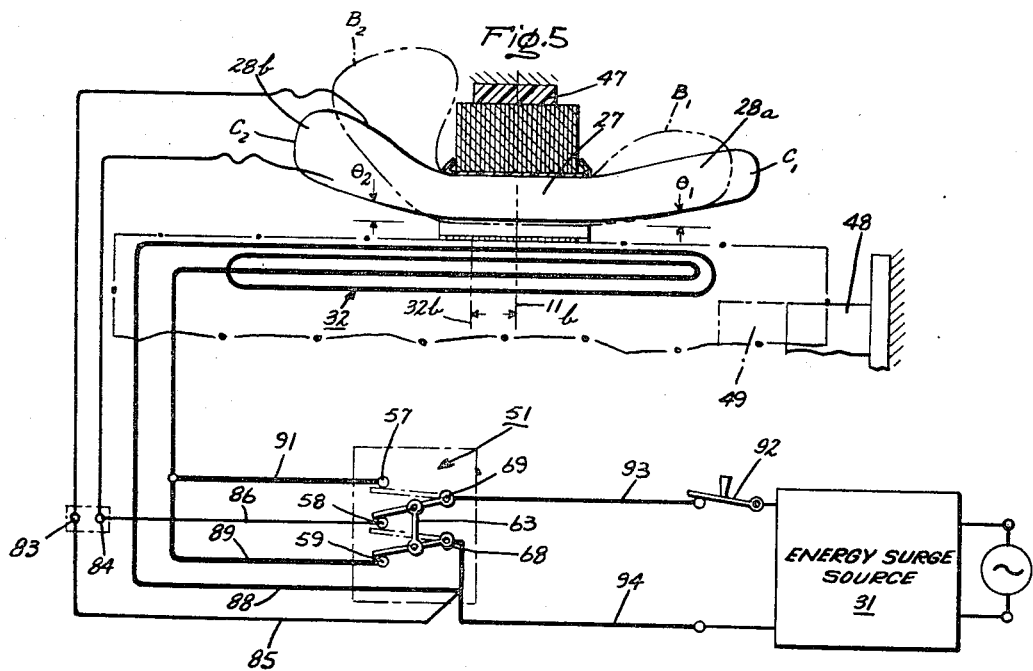
INVENTOR.
Richard D. Gibbs,
BY John M. Stoudt
Attorney.

United States Patent Office 3,407,474
Patented Oct. 29, 1968

3,407,474
APPARATUS FOR OBTAINING DESIRED POSITIONS OF ELECTRICAL COILS RELATIVE TO MAGNETIC CORES
Richard D. Gibbs, Malta, Ill., assignor to General Electric Company, a corporation of New York
Filed July 28, 1966, Ser. No. 568,605
4 Claims. (Cl. 29—205)

*Background of the invention*

This invention relates to an apparatus for obtaining a desired position of at least one electrical coil relative to a magnetic core required in the manufacture of inductive devices. More particularly, the present invention relates to such apparatus as is especially suitable for effecting changes in relative positions of coils with respect to cores in the manufacture of dynamoelectric machine members incorporated in small and fractional horsepower electric motors.

In the fabrication of electrical devices, it is normally the practice to place a number of coils, formed by a plurality of insulated conductor wire turns, into coil accommodating slots of a magnetic core and thereafter to effect a desired placement operation on the coil in an attempt to produce a desired position of the conductor turns of the coil relative to the core. By way of illustration in certain stators used in fractional and small horsepower motors, after the coils have been installed into the core slot it is necessary to force back the individual conductor turns in the coil side portions accommodated in the slots, away from the bore and toward the bottom of the slots. This is especially desirable since in most stator core constructions certain slots carry more than one coil side portion, and additional space is needed in the same slot for accommodating side portions of other coils. It is also necessary to force back the end turn portions of the coils which project beyond each end face of the stator for a number of reasons well known to those skilled in the art. Among the more critical reasons are the space limitations placed upon a stator by a given application which may dictate different degrees of compaction and relative positions of end turn portions with respect to the core for each side of the casing.

Until recently force back of both the end turn portions and the side turn portions was attempted by mechanical equipment which engaged the outer surfaces of the coils and applied pressure to these surfaces for forcing the coils back away from the bore. However, recent innovations have eliminated physical contact with the outer surfaces of the coils and instead force back the coils by electrical energy. The disclosures set forth in the following United States applications are representative of this new approach: 414,822; 414,823; 414,824; 414,825; and 414,826 all filed on Nov. 30, 1964 and assigned to the same assignee as the present invention. These applications issued on Aug. 1, 1967 into U.S. Patents Nos. 3,333,327–3,333,330 inclusive and 3,333,335.

In studying the coil placing operations effected by the utilization of electrical energy, I have discovered from high speed films taken on the operation that generally speaking the operation is completed in less than one hundred microseconds. Considering the placement of the end turn portions of the coils, I have found that the individual coil turns move slightly beyond the final position and tend to oscillate rapidly before coming to rest at the final position. This is probably due to the inherent flexibility of the individual turns of the coils and to the type of forces which act on the coils. In any case, whether as a result of these or other causes, especially in situations where winding equipment provide slot space factors in excess of approximately 50%, it is difficult to furnish a highly accurate final position of the end turns relative to the core end faces without resort to use of dies or the like. This problem becomes even more complex where the space for receiving the end turn portions in a given application is quite limited. A further complication arises for those situations which require different relative positions of end turn portions with respect to the associated end face, a so-called asymmetrical end turn coil placement operation.

Consequently, it is quite desirable to utilize electrical energy to force back coil turns relative to a core which will not only compact the turns carried by the slots of the core, but in addition will furnish a compact mass of end turn portions which are accurately located with respect to end faces of the core without resort to dies or the like. It is further desirable to provide an economical procedure and apparatus which is versatile in nature, capable of effecting asymmetrical as well as symmetrical coil end turn placement operations easily and quickly. Also, the procedure and apparatus should be adaptable for use in the mass production manufacture of inductive devices, especially in the production of dynamoelectric machine members where the problems are particularly troublesome and complex.

*Summary of the invention*

Accordingly, it is a primary object of the present invention to provide an improved apparatus for obtaining desired positions of electrical coils relative to magnetic cores required in the manufacture of inductive devices.

It is a further object of the present invention to provide an improved, yet economical apparatus, especially suitable for use in the manufacture of dynamoelectric machine members, which is versatile in application and furnishes accurate positions of electrical coil end turns relative to cores carrying the coils without need for dies or similar end turn positioning equipment.

It is yet another object of the present invention to provide an improved apparatus for efficiently obtaining asymmetrical and symmetrical coil end turn placement relative to a core which overcomes the difficulties and attains the desirable features mentioned above.

In accordance with one form of the present invention apparatus is provided which includes an electrical winding supported in inductive relation to the coils of an excitation winding carried by a magnetic core, a suitable energy surge source, and means for selectively connecting either one of the windings to the surge source in order to inject an energy surge thereto and for producing a closed electrical path through the other winding. In the illustrated embodiments, the selective means is in the form of a double-pole, double-throw switch having sufficient mass to conduct the energy surge through it either to the selected coils or electrical winding.

This efficient yet economical apparatus is quite versatile in nature, and may be utilized to produce either symmetrical or asymmetrical end turns accurately positioned relative to an associated end face of the core. For symmetry of both sets of end turns, the radial center of the electrical winding should be aligned with respect to the radial center of the core. By merely off-setting the radial centers, the end turns on either side of the core will assume different positions relative to the associated core end face and axis. In addition, the apparatus need not incorporate dies or the like to furnish the accurate positions of the end turns relative to the core, among other benefits.

*Brief description of the drawings*

The subject matter which I regard as my invention is particularly pointed out and distinctly claimed in the concluding portion of the specification. My invention itself, however, both as to its organization and method of operation together with further objects and advantages thereof may be best understood by reference to the following description taken in connection with the accompanying drawings.

FIGURE 1 is an end view, partially in a diagrammatic form, of a stator core carrying an excitation winding and electrical inductive apparatus including a primary electrical winding arranged in inductive coupled relationship to the coils of the excitation winding, the view showing the stator coils connected in a closed electrical path and the primary winding connected in circuit to a suitable energy surge source in accordance with one form of the invention, the view further illustrating the preferred embodiment of the apparatus;

FIGURE 2 is an enlarged fragmentary view of one of the coil accommodating slots for the stator shown in FIGURE 1, the view revealing the distribution therein of conductor turns and the slot insulation prior to the practice of the present invention;

FIGURE 3 is a sectional view in schematic form showing one form of the present invention being practiced on a coil group of the stator revealed in FIGURE 1 to show the force back of the side portions and end turn portions and transfer of the end turn portions to the final desired position relative to the core;

FIGURE 4 is a schematic sectional view similar to FIGURE 3 showing a modification of the present invention and the first step in obtaining asymmetrical coil end turn portions, with the portions on the respective sides of the core being disposed at different locations and having different degrees of compaction; and FIGURE 5 is a view similar to FIGURE 4 showing in schematic form the obtainment of the desired asymmetrical positions of the end turn portions on either side of the core.

*Description of preferred embodiments*

Referring now more particularly to the drawings, for purposes of disclosing principles of the present invention, one form of apparatus for obtaining the desired positions of electrical coils relative to a magnetic core of an inductive device has been illustrated in connection with a dynamoelectric machine stator member. The stator core of the member, generally indicated by numeral 11 is constructed from a predetermined number of stacked or aligned magnetic laminations which are punched into the illustrated configuration from suitable relatively thin magnetic sheet material, such as electrical steel or iron. The laminations are conventionally secured together in stacked face to face relationship by keys 12 frictionally received by complementing angularly spaced apart notches 13 which extend axially across the stack in the usual way. Since in the present exemplification, the electrical coils are adapted to provide four pole operation, the stator core includes the customary thirty-six slots 14 formed between adjacent teeth sections 16 integrally joined together by yoke section 17. The teeth sections terminate in enlarged lip portions 18 which together define a cylindrical rotor receiving bore 19 and thirty-six equally spaced apart slot entrances 21. Each of the slots has a standard geenrally U-shaped slot liner 22 formed of suitable material, such as the well known polyethylene terephthalate sheet material, to provide electrical ground insulation next to the slot wall for the coil turns.

The stator core carries a main field or excitation winding 20 of the distributed wound type and in the exemplification has four identical core groups 23, 24, 25, and 26 serially connected, with each group including three coils spanning four, six, and eight teeth respectively. Each of the coils is in turn wound of a predetermined number of wire conductor turns from aluminum, copper or the like, having the usual relatively thin continuous coating of electrical insulation or enamel adhering to the individual turns.

At this stage of the fabrication, due at least in part to the turn distribution of the coils, there is a general tendency for the inner radial coil turns to be urged in the direction of the axis of the core, both the individual turns 27 (FIGURE 2) of the side turn portions of the slot as well as the end turn portions 28 shown schematically in FIGURE 3, with the individual turns being somewhat loosely distributed in the initial position relative to the core, as shown in FIGURE 2 and by position A in FIGURE 3.

Applying one form of the present invention to the stator core and coils of the exemplification, the electrical core groups 23 through 26 inclusive are connected such that they provide a closed electrical path and at least one surge of electrical energy of a preselected magnitude is injected from a suitable energy surge source 31 into a primary winding 32 maintained in a fixed and inductive relation with the individual coil groups of the excitation windings. As a result of the injection of the surge of energy into winding 32 and the inductive relation, a current surge is generated through the winding and an induced current surge through the coils. Electromagnetic forces resulting from the interaction of the currents and a transient magnetic field produced by the energy surge effectively act on the turns to effect transfer of them from position A to position B shown in FIGURE 3. The end turns become partially compacted, yet flared (slightly exaggerated) during the transfer, with the outer turns preferably being located near the associated core end face and the inner turns located at an angle $\phi$ from the axis of the core. This angle is generally determined by the magnitude of the surge, the type, size, and configuration of the coils and core, among the more important factors.

Still referring to FIGURE 3 the individual conductors of the coil side portions are pushed back toward the bottom of the slots against the slot liners 22 into a compact mass, position B in FIGURE 3. In spite of the fact that the slot may be of an unusual configuration, that part of the slot walls near entrance 21 may be exposed as shown in FIGURE 2 and that the winding operation may have placed the turns into the slot with a slot space factor in excess of 50%, the winding turns will be effectively and efficiently forced back with negligible turn to turn voltage.

Thereafter the end turn portions are moved to the desired position (C in FIGURE 3) axially toward the bore of the core in a compact mass while at the same time the individual turns in the slots are being compacted even further adjacent the bottoms of the slots. This is achieved by injecting an energy surge of preselected magnitude directly into the coils of the main excitation winding. It is believed that end turns 28 move away from the core rather than towards the core due at least in part to the forces acting on the turns after the core saturates which tend to draw the individual turns together by mutual attraction into a compact bundle as compared with the somewhat flared relation at position B. This tendency to bundle into a compact mass seems to move the end turns rapidly away from the associated end face toward the bore, without adversely affecting the compaction being attained for the turns in the slots.

The final position $\theta$ of the end turns relative to the core axis can be controlled by the magntiude of the energy surge chosen for the given application which must be below that which deleteriously affects the insulation of the turns. This control may be implemented by providing a closed electrical path for winding 32 and maintaining it in inductive relation with the coils of the excitation winding as the coils are being transferred to position C. Induced current flow through winding 32 resulting from the energy surge injected into the coils will create forces which act on the end turns in a direction away from the axis of the core. These forces increase as the coil end turns travel toward winding 32 and thus winding 32 not only will tend to minimize oscillation of the end turns as they approach the desired position, but in addition will assist in accurately determining angle $\theta$ for a given application without need for dies or the like. In addition, the induced current flow through winding 32 will also augment the compaction attained of the coil side turn portions.

Turning now to the apparatus which may be utilized in the practice of the method as described above, reference should be made to FIGURE 1 and 3. The primary winding 32 is mounted in fixture 33 which may be constructed in any suitable manner, such as that described more fully in the copending U.S. patent application S.N. 414,826 mentioned above or the one disclosed and claimed in my copending application 568,587 filed the same day as the instant application. The primary winding 32 in the present exemplification includes four groups of coils 43, 44, 45, 46, which define magnetic poles essentially simulating the four magnetic poles of the excitation winding, both in axial length and angular width. In order to produce the highest possible levels and to produce symmetrical end turns on either side of the core (equivalent angle $\theta$ and degree of compaction) the axial and radial center $11a$ of each magnetic pole for winding 20 is maintained in alignment with the equivalent center $32a$ of the adjacent magnetic pole of winding 32. The fixture 33 and core 11 are maintained in the desired non-movable relation during the practice of the method by any suitable means, as by a stationary supporting platform 47 formed of non-magnetic insulating material which engages the periphery of the core and stationary studs 48 or the like which enter a number of holes 49 etxending axially into a rigid body from one end of fixture 33.

In order to provide a closed electrical path through one of the windings and selectively connect the other one to the energy surge source 31, an arrangement such as that depicted in FIGURE 1 may be employed. The arrangement includes a double-pole, double-throw switch 51 formed with an outer cylindrical housing 52 fabricated from non-magnetic insulating material. Electrically conductive contact elements 53, 54, and 55 are mounted within housing 52 in axially spaced apart relation and have electrical terminal posts 57, 58, 59 projecting outwardly through the housing walls. The central element has opposed contact surfaces facing the single contact surfaces of elements 53, 55, with all surfaces being frusto-conical in configuration and preferably being coated with silver or the like to provide a good electrical contact selectively with a pair of unusually shaped movable contact elements secured to a central actuator rod formed of non-magnetic material which form the movable blade 63 of the switch. The mass of these elements must be sufficiently great to carry the magnitude of the energy surge and the contact surfaces adapted to engage one another are complementary in shape.

To further insure that both elements of blade 63 make the proper simultaneous closed circuit connection with the stationary elements, central element 54 is non-movably secured in place, as by a number of screws 56 while slight axial movement is permitted for elements 53 and 55. These latter two elements are biased toward central element 54 by springs 61 held in assembled position by threaded closures 62 such that one contact surface of blade 63 will make initial engagement with a surface of either element 53 or 55 just prior to engagement of another contact surface of blade 63 with central element 54. Thus, whether blade 63 is in the extended or depressed position, satisfactory electrical engagement of both movable elements with element 54 and either element 53 or 55 will always occur. Elongated slots 72, 73 are formed in switch housing 52 to receive electrical terminal posts 68, 69 of blades 63 and to permit the necessary movement of these posts as the movable elements are transferred between the associated stationary elements. The actuator rod is in turn biased to the extended position in which blade 63 engages elements 54, 55 by a suitable spring 74 held under compression between the outer wall of the housing and a nut 76.

During the practice of the present invention wire terminations 81, 82 for the excitation winding 20 are connected in circuit with switch 51 through suitable electrical connectors 83, 84 having movable teeth for cutting through the insulation on the wire terminations to make a good elecrical contact with the excitation winding. Connector 82 is in circuit with post 68 through lead 85, while lead 86 attaches connector 83 to movable contact post 68. With respect to the primary winding 32, it has covered leads 88, 89 respectively connected to posts 68, 59 with jumper 91 placing stationary post 59 in circuit with stationary post 57. Thus, with the switch elements in the relative positions shown in FIGURE 1, the coils of the excitation winding 20 will have a closed electrical path between connectors 83, 84 through lead 85, post 68, through the engaged contact elements to post 58 and then through conductor 86 to connector 84.

Switch 51 simultaneously places primary winding 32 in closed circuit across the terminals of the energy surge source 31, on the one side through winding lead 89, post 59, through jumper 91 to post 57, then to post 69 and line 93 by way of closed contact element 53 with one of the movable blade elements. The other side 88 of the winding 32 is attached to line 94 through movable common post 68.

In order to supply the preselected energy surge to primary winding 32, the energy surge source may be suitably actuated as by closing switch 92 of the source. This energy surge source circuit may be of any type capable of supplying the desired energy surge, such as that more fully described and disclosed in the aforementioned U.S. patent application S.N. 414,826. For example, closing of switch 92 actuates a circuit for charging a capacitor bank in the source 31 to a selected voltage level, which is regulated by a variable control transformer. After a predetermined interval, the capacitor bank discharges a surge of electrical energy, as controlled by the voltage level on the capacitor bank, through switch 51 to primary winding 32. This in turn produces the induced current flow through winding 20 and the interacting faces and coil transfer to position B already outlined.

The selective connection of the excitation winding 20 to the surge source and short circuit of primary winding 32 for transferring coils to position C are effected by moving the actuator rod of the movable blade assembly to the left to secure the movable elements in engagement with contact elements 54, 55. As schematically shown in FIGURE 3, primary winding 32 is in a closed path between leads 89 through the closed switch elements of post 59, 68. The circuit between the excitation winding 20 and the energy surge source 31 is established from line 93 to closed contact elements of post 69, 58 and then through conductor 86 to connector 84. On the other side, connector 83 is in circuit with line 94 through conductor 85 and common post 68. Surge source 31 may again be activated by actuating switch 92 and the surge of preselected magnitude injected into winding 20 through switch 51 as the primary winding 32 is short circuited.

For the purpose of more clearly illustrating how the apparatus embodying one form of my invention as described above has been satisfactorily carried out in actual practice, I will now set forth a specific example without intending to limit the present invention to that example. In particular, a number of cores were constructed with the configurations shown in FIGURE 1 and carried coils distributed in the slots in the manner revealed by that figure. The cores had the following nominal dimensions: bore diameter of 3.48 inches; corner-to-corner dimension of 6.29 inches; stack height of 0.9 inch; and slots carrying main windings varied in depth from 0.54 to 0.78 inch. The coils were formed of enameled aluminum coated with polyvinyl formal type resin, having a nominal bare wire diameter of 0.038 inch and a total weight of 0.436 pound. Each pole had 109.55 effective turns, with the turns per coil (innermost/outermost)

being thirty-three, forty-four, and fifty-one. The stator was of the type normally used in a one-sixth horsepower, single phase electric motor rated at 115 volts, 4.5 amps, 60 cycles per second.

The pulsing circuit or energy surge source incorporates a capacitor bank of 610 microfarads having a nominal rating of 630 microfarads. In one application, the capacitor bank was charged to a voltage level of 1,800 volts and a surge discharged into the primary winding 32 as the excitation winding was short circuited. The surge had a peak of approximately 8,000 amperes at 3½ microseconds, with the surge lasting for about six microseconds. This moves back the coil side turns away from the bore approximately ⅛ to 3/16 inch. Angle $\phi$ was between 25–30°, with the end turns having a contour somewhat similar to that shown in phantom at B in FIGURE 3.

Thereafter, with the primary winding 32 being short circuited and the coils of winding 20 in circuit source 31, the capacitor bank was charged to a voltage level of 1,600 volts and a surge subsequently discharged into winding 20. The surge peak of approximately 500 amperes appeared in about two milliseconds, the duration of the surge lasting approximately five milliseconds. This further compacted the coils in the slots, moving them another 1/16 of an inch away from the bore. At the same time, the end turns were compacted into a tight bundle which were transferred to positions C shown in FIGURE 3 to an angle $\theta$ of 20°.

After the second surge, the coils were found to have assumed the desired position relative ot the core including compaction in the slots exceeding 65% slot space factor. A 2,000 volt high potential test in accordance with NEMA standard MG 1–12.03 and a 3,000 volt repetitive surge test (NEMA standard MG 1–12.05) were carried out on winding 20 with completely satisfactory results.

It was discovered in actual practice that best results may be derived when employing an energy source having a capacitor bank by charging the bank to a somewhat higher voltage level when the surge is being injected into primary winding 32. This not only transfers the turns away from the slot entrances without any adverse affects, but also produces an unusually large angle $\phi$ to furnish a greater number of choices for angle $\theta$. For example, in actual practice I have provided an angle $\phi$ as great as 55° to 60° and an angle $\theta$ as little as one degree without any difficulty. The control of angle $\theta$ and the degree of compaction for the coil turns, both in the slots and at the end faces of the core, are easily and accurately obtained without need to resort to dies and the like.

The unusual versatility and accurate control afforded the end turn compaction and placement by the present invention is further revealed in FIGURES 4 and 5. In this exemplification, the end turn portions on either side of the core are being positioned asymmetrically, especially significant for those situations having different space requirements for each side of the core.

For purposes of illustration, it will be assumed that coil end turns of the right side of the core, as viewed in FIGURES 4 and 5, should be more compact and closer to the core axis than the end turn portions located at the left hand side of the core. In addition, like parts already described in connection with FIGURES 1–3 inclusive are identified by identical reference characters.

In order to achieve this end, primary winding 32 is mounted such that its radial center 32b is offset from center 11b of the core in a direction toward the left by a preselected distance D. Thus, the end of winding 32 will terminate axially short of the axial extent for the right end turn portions. During press back, with the excitation winding being in a closed electrical path and the energy surge being injected into winding 32, the right end turns 28 will be transferred from $A_1$ to $B_1$, an angle $\phi_1$, which is less than angle $\phi_2$ for the left end turns as they move to position $B_2$ from $A_2$. Since the primary winding does not extend for the full axial length of the right end turns, the resulting interaction at that location between windings 20, 32 will not be as great as on the left side. The side turn portions 27 will be compacted in the manner already described in connection with FIGURES 1 and 3.

Thereafter, when the primary winding is short circuited and the excitation winding connected in circuit with source 31 through switch 51 (FIGURE 5), a surge is injected through the switch to winding 20. During this force back of the coil turns, the same dimension D is maintained between 32b and 11b for the first step. The right end turns will be compacted to a greater degree than those on the left side as they assume position $C_1$, but will not move appreciably away from the position $B_1$ as compared to the change of positions $B_2$ to $C_2$ for the left end turns. This may be due in part to the proximity already of position $B_1$ to winding 32 and to the type of bundling affect occurring for the left end turns in view of their flared apart realtive turn positions. Angle $\theta_1$ is thus slightly less than $\theta_2$ and the right end turns disposed closer to the core axis than those on the left side.

It will be recognized that a change of dimension D, the amount of off-set, in FIGURES 4 and 5 will have a corresponding effect on the magnitude of the difference between the right and left end turns relative to the core axis. The final positions of the right and left end turns may also be readily controlled by the magnitude of the surge or surges applied in each step as well as by changing the off-set as angles $\phi$ and $\theta$ are provided. For example, the off-set may be employed for only one energy surge and on the other side for the next surge. The variations to effect the desired control are numerous.

In summary, from the foregoing description of the apparatus exemplifying one form of the invention, it will be apparent that accurate control of coil placement relative to a core can economically and efficiently be effected without need for dies and like equipment. Further, the invention is versatile in nature and can easily produce either symmetrical or asymmetrical coil end turn placement. The apparatus are adaptable for mass production manufacture in inductive devices, especially in the fabrication of small and fractional horsepower dynamoelectric machine members where problems are particularly vexing.

The illustrative embodiments of the present invention have been shown in connection with stators; however, it will be obvious that the present invention is applicable to inductive devices other than the illustrated exemplifications where it is necessary to move or displace coils with respect to a coil accommodating member. In addition, although the apparatus has been shown in connection with the coil placing operations on an entire excitation winding, it will be appreciated that it can be employed with one or more coils to obtain the desired position relative to the slotted coil accommodating member.

While I have shown and described preferred embodiments and certain features of my invention, it will thus be obvious to those skilled in the art that changes and modifications may be made without departing from the invention. It is, therefore, intended in the appended claims to cover all equivalent variations as fall within the true spirit and scope of my invention.

What I claim as new and desire to secure by Letters Patent of the United States is:

1. Apparatus for attaining a desired position relative to a magnetic core of a first electrical winding formed by a plurality of conductor turns and carried by a magnetic core, the apparatus comprising a second electrical winding maintained in inductive coupled relation with the first winding; energy surge source means for supplying at least one energy surge to one of said windings; and means for selectively producing a closed electrical path through one of the first and second windings for induced current flow therethrough and concurrently for connecting the other of the first and second windings to the energy surge source means such that at least one energy surge supplied by the energy surge source means is injected into the other winding to induce current flow in the winding having the closed electrical path thereby creating electromagnetic forces to act upon the first electrical winding to move it relative to the magnetic core.

2. The apparatus of claim 1 in which the means for selectively producing a closed electrical path through one of the first and second windings and for connecting the other of the first and second windings to the energy surge source means produces a closed electrical path initially through said first winding and connects the second winding to the energy surge source means, the selective means being actuable to produce a closed path in the second winding and to connect the first winding with the energy surge source means.

3. The apparatus of claim 1 in which the means for seelctively producing a closed electrical path through one of the first and second windings and for connecting the other of the first and second windings to the energy surge source means includes a double pole, double throw switch.

4. The apparatus of claim 1 in which the first electrical winding extends axially through the core and the second electrical winding is manitained in an axially off-set relation with respect to the first electrical winding when the first and second windings are inductively coupled to control the size of the electromagnetic forces acting upon different portions of the electrical winding carried by the core.

References Cited
UNITED STATES PATENTS

| | | | |
|---|---|---|---|
| 3,333,327 | 8/1967 | Larsen | 29—596 |
| 3,333,328 | 8/1967 | Rushing | 29—596 |
| 3,333,329 | 8/1967 | Linkous | 29—596 |
| 3,333,330 | 8/1967 | Linkous | 29—596 |
| 3,333,335 | 8/1967 | Sims | 29—606 |
| 3,348,183 | 10/1967 | Hodges et al. | 29—596 XR |
| 3,353,251 | 11/1967 | Linkous | 29—205 |

JOHN F. CAMPBELL, *Primary Examiner.*

J. L. CLINE, *Assistant Examiner.*